(12) United States Patent
Werber et al.

(10) Patent No.: US 8,156,802 B2
(45) Date of Patent: Apr. 17, 2012

(54) ROLLER COMPRISING A FORCE SENSOR

(75) Inventors: Rudolf Werber, Konigsbrunn (DE); Tobias Hain, Augsburg (DE); Frank Thurner, Augsburg (DE)

(73) Assignee: Texmag GmbH Vertriebsgesellschaft, Thalwil (CH)

( * ) Notice: Subject to any disclaimer, the term of this patent is extended or adjusted under 35 U.S.C. 154(b) by 377 days.

(21) Appl. No.: 12/312,951

(22) PCT Filed: Dec. 3, 2007

(86) PCT No.: PCT/EP2007/010481
§ 371 (c)(1),
(2), (4) Date: Jul. 23, 2009

(87) PCT Pub. No.: WO2008/064917
PCT Pub. Date: Jun. 5, 2008

(65) Prior Publication Data
US 2010/0011883 A1    Jan. 21, 2010

(30) Foreign Application Priority Data

Dec. 2, 2006 (EP) .................................. 06024969

(51) Int. Cl.
*G01L 5/04* (2006.01)
(52) U.S. Cl. ......................................................... 73/159
(58) Field of Classification Search ....................... 73/159
See application file for complete search history.

(56) References Cited

U.S. PATENT DOCUMENTS

| | | | | |
|---|---|---|---|---|
| 3,850,032 A | * | 11/1974 | Rodach et al. | 73/862.07 |
| 4,735,102 A | * | 4/1988 | Koenig | 73/862.474 |
| 4,765,423 A | | 8/1988 | Karpa | |
| 6,250,146 B1 | * | 6/2001 | Callendrier | 73/159 |
| 7,895,907 B2 | * | 3/2011 | Thumer et al. | 73/862.391 |
| 2004/0181312 A1 | | 9/2004 | Miura et al. | |

FOREIGN PATENT DOCUMENTS

| | | |
|---|---|---|
| DE | 953 840 | 12/1956 |
| DE | 10 2006 023 529 | 11/2007 |
| EP | 0 107 958 | 10/1983 |
| EP | 0 708 319 A1 | 4/1996 |
| EP | 1 584 907 A1 | 10/2005 |
| WO | WO 2006/010673 A1 | 2/2006 |
| WO | WO 2006/087428 A1 | 2/2006 |

\* cited by examiner

*Primary Examiner* — Lisa Caputo
*Assistant Examiner* — Octavia Davis-Hollington
(74) *Attorney, Agent, or Firm* — Robert L. Epstein; Epstein Drangel LLP

(57) ABSTRACT

The invention relates to a force sensor for measuring a bearing force of a roller deviating a web of material. The force sensor includes a base element on which at least one sensor element is supported. The sensor element has at least one plate which can be elastically deformed by the bearing force and is provided with at least one force transducer. The sensor element is loaded by a pressure piece into which the bearing force is introduced by means of a spring. The spring has a larger range of spring—in the direction of the force—than the elastically deformable plate for the same load. In order to limit the action of the force on the sensor element, an annular abutment is provided, against which the pressure piece can be pressed flat. The abutment is provided around the sensor element.

25 Claims, 1 Drawing Sheet

ROLLER COMPRISING A FORCE SENSOR

The invention relates to a roller comprising a force sensor for measurement of a bearing force of the roller, as claimed in the precharacterizing clause of patent claim 1.

DE 101 18 887 C1 discloses a force sensor for detection of a bearing force of a roller which deflects a web of material. This force sensor has a base element which is held stationary on a shaft that is fixed to the machine. This base element is integrally connected to a sensor element which has two elastically deformable double bending beams. A pressure piece acts on each of these double bending beams and is loaded directly by the bearing force to be measured. Both double bending beams are provided with a force pickup in the area of their greatest curvature, in order to detect the deformation of the double bending beams resulting from the bearing force.

US 2004/181312 A1 discloses a robot having a force sensor. This force sensor has a deformable plate to which a sensor element is fitted. The force itself is introduced into the deformable plate via a pressure piece and a spring. The object of the spring in this case is to allow objects to be touched softly. When the pressure piece comes into contact with a hard object, then the spring is first of all compressed, as a result of which the contact force remains low initially. As the movement toward this object continues, the compression force acting increases, and this is detected by the sensor. Force regulation therefore has the capability to slow down the approaching movement in such a way that a specific, predetermined holding force is achieved.

DE 953 840 C discloses a roller having a force measurement apparatus for detection of the bearing force. This roller is supported on an elastically flexible plate and can thus change its position slightly, corresponding to the bearing force that occurs. The position of the roller itself is measured via a plunger-type coil arrangement, in order to determine the bearing force that occurs.

The invention is based on the object of providing a roller having a force sensor of the type mentioned initially, which is distinguished by better reliability.

According to the invention, this object is achieved by the features of patent claim 1.

The roller as claimed in claim 1 is used to measure a bearing force of a roller which deflects a web of material. The web of material is in this case preferably a web of paper, corrugated paper, film, textile, felt or a mesh web. It can be formed such that it passes through, or can be in the form of a revolving endless web. If the weight of the roller is known and the angle through which the web of material loops around it are known, the tensile stress on the web of material can be calculated from this, and this is of considerable importance for various applications, in particular tensile stress control systems. The force sensor has a base element which is generally fixed to the machine and is therefore arranged in a stationary manner. At least one sensor element which carries out the actual force detection is provided on this base element. In this case, it is irrelevant whether this sensor element is integrally connected to the base element or forms a separate part supported on the base element. The sensor element has at least one plate which can be deformed elastically by the bearing force to be measured and converts the bearing force to be detected to a proportional deformation. This elastic deformation is converted by means of at least one force pickup, preferably a strain gauge, to an electrical measurement signal, in particular a resistance change. In order to introduce the bearing force into the sensor element, the latter is loaded by a pressure piece which transmits the bearing force to be measured to the elastically deformable plate. While the web of material is moving around the deflecting roller, considerable force peaks frequently occur, caused, for example, by irregularities in the web of material itself or in the movement of the web. In the event of a tear in the web or lap formation, the roller is likewise subjected to very high loads. High force peaks also occur during installation of the roller since its total weight is suddenly placed on the force sensor. These force peaks may amount to many times the average bearing force to be measured although they occur only for a very short time, preferably in the region of microseconds. The roller mechanism and the web of material as well can therefore withstand such short force peaks without any problems. In contrast, the sensor element and in particular the force pickup are very frequently destroyed by these force peaks. In order to keep these force peaks away from the sensor element as much as possible, the force is introduced into the pressure piece via at least one spring. This spring is in this case designed such that, considered in the force direction, it has a greater spring movement for the same load than the elastically deformable plate. When a shock occurs on the roller, the roller bearing can thus deflect this force, as a result of which the maximum value of the force peak on the sensor element is correspondingly reduced. This has no influence on the measurement result since the spring stores the energy of this impact essentially as elastic energy, and passes it on to the sensor element with a delay. The force peak is therefore made smaller and broader by this measure thus overall correspondingly reducing the peak load on the sensor element. The measured mean value of the bearing force over time is, however, not affected by this measure. Nevertheless, when very high force peaks occur, for example on passing through a splice in the web of material, it is possible for the sensor element to be subject to shocks which are so severe that it would be destroyed despite this measure. For this reason, the pressure piece can be pressed against a stop on the base element in order to limit the force acting on the sensor element. This stop therefore limits the maximum movement of the pressure piece to a value which in general cannot damage the sensor element. A portion of the bearing force therefore bypasses the sensor element and is dissipated into the base element via the stop. This admittedly corrupts the measurement results but ensures that the serviceability of the sensor element is maintained. In any case, the measurement error is in this case tolerable since high force peaks such as these which still result in a destructive magnitude for the sensor element despite the spring having been installed in the force movement, cannot be regulated out in any case since they are too short. Since severe impacts such as these are very rare, this form of measurement error can be accepted without any problems. However, the specific configuration of the stop is important since it has to absorb considerable impulse energies, particularly in the case of impacts. Firstly, it must be manufactured sufficiently precisely such that it does not unnecessarily restrict the measurement range of the sensor element on the one hand while on the other hand does not make it necessary to accept any danger to the sensor element. Secondly, the stop must not be deformed by the impact energy. Finally, it is necessary to ensure that the sensor element returns to its initial position again after a severe impact such as this. In order to achieve these different objects, the stop is in the form of a ring around the sensor element. The pressure piece can in this case be pushed flat against the stop, thus resulting in the pressure piece being supported precisely in the stop. In addition, this stop does not create any lateral forces or tilting forces whatsoever, which could lead to tilting of the pressure piece and therefore to it becoming jammed. The force sensor is optimally protected against severe impacts in this way. This considerably increases the life of the sensor element.

In order to allow the size of the stop to be optimally matched to the respective sensor element, it is advantageous as claimed in claim 2 for the stop to rest loosely on the base element. The stop can therefore very easily be replaced by a different one with a matched height, if this is necessary for matching to the height of the sensor element.

In order to allow the stop to be matched as easily as possible to different heights of the sensor elements, it is advantageous as claimed in claim 3 for the stop to comprise a plurality of parts which can be stacked one on top of the other. This allows the stop height to be composed of standard parts in a kit, without having to manufacture an individual stop for each sensor element.

In order that the stop can also withstand high impact loads over a long time, it is advantageous as claimed in claim 4 for it to be manufactured from hardened steel.

In order to reduce the impact of the pressure piece on the stop and therefore to increase the life of the pressure piece, it is advantageous as claimed in claim 5 for at least one further spring to be connected in parallel with the stop. This further spring should, however, be dimensioned to be weak in comparison to the first spring in order not to adversely affect the measurement results achieved by the sensor element. This additional spring reduces the impact load of the stop, and thus lengthens its life.

Alternatively or additionally, as claimed in claim 6, it is also possible to provide at least one spring element between the force pickup and the elastically deformable plate. This spring element protects the force pickup against excessive loading. If the deformation of the elastically deformable plate becomes excessive as a result of a considerable impact load, then the spring element can absorb part of the deformation thus correspondingly reducing the risk of the force pickup fracturing. If necessary, this makes it possible to dispense with the additionally provided stop. However, this stop is nevertheless advantageous as an additional securing measure for the sensor element.

A rubber-like component has proven advantageous for the design of the spring element as claimed in claim 7, which can absorb the deformation itself, in the form of elastic stressing. The elastic component is preferably composed of silicone rubber.

It is also advantageous, as claimed in claim 8, for the spring element to be formed by a thin membrane which is connected over an area to the elastically deformable plate and to the force pickup. During the normal operation, the force pickup in this way transmits the deformation of the elastically deformable plate to the force pickup with virtually no losses. Additional deformation of the thin membrane, which protects the force pickup against destruction, occurs only in the event of very high impact loads.

Claim 9 specifies one simple implementation of the force pickup in the form of a strain gauge. A strain gauge has the advantage that it converts even minor deformations of the sensor element to an electrical signal which can be evaluated well, specifically a resistance change. Strain gauges admittedly have the disadvantage that they are relatively highly dependent on the temperature, but this could easily be compensated for, for example, by construction of a Wheatstone bridge.

In order to protect the force sensor against extreme disturbances, for example a web crack or a web lay, it is advantageous as claimed in claim 10 for the force sensor to have at least one associated limit switch. This limit switch is triggered when the bearing force exceeds a predetermined level. The drive apparatus for the web of material is preferably interrupted by the limit switch.

In order to achieve a simple design, it is advantageous as claimed in claim 11 for the limit switch to be provided in the area of the stop of the force sensor. The limit switch is therefore always operated whenever an impact is sufficiently severe to operate the stop itself.

In order to simplify the assembly of the force sensor, it is advantageous as claimed in claim 12 for the force sensor to have at least one associated thrust screw. This thrust screw can reduce the load on the force sensor, in order to allow it to be replaced easily. The thrust screw is also used as a transport security device for the roller.

Finally, it is advantageous, as claimed in claim 13, for the spring to be supported: on a bell. The bell protects the internal fittings of the force sensor and nevertheless ensures that force is introduced in a simple manner into the sensor element. In order to prevent the bell from being lost when the force sensor is transported if it is installed upside-down, a securing element is provided between the bell and the base element. This securing element is preferably formed by a screw which passes through a hole in the bell. The securing element does not touch the bell in the normal operating state.

The subject matter of the invention will be explained, without restricting the scope of protection, using the drawing, by way of example, in which.

Figure 1:
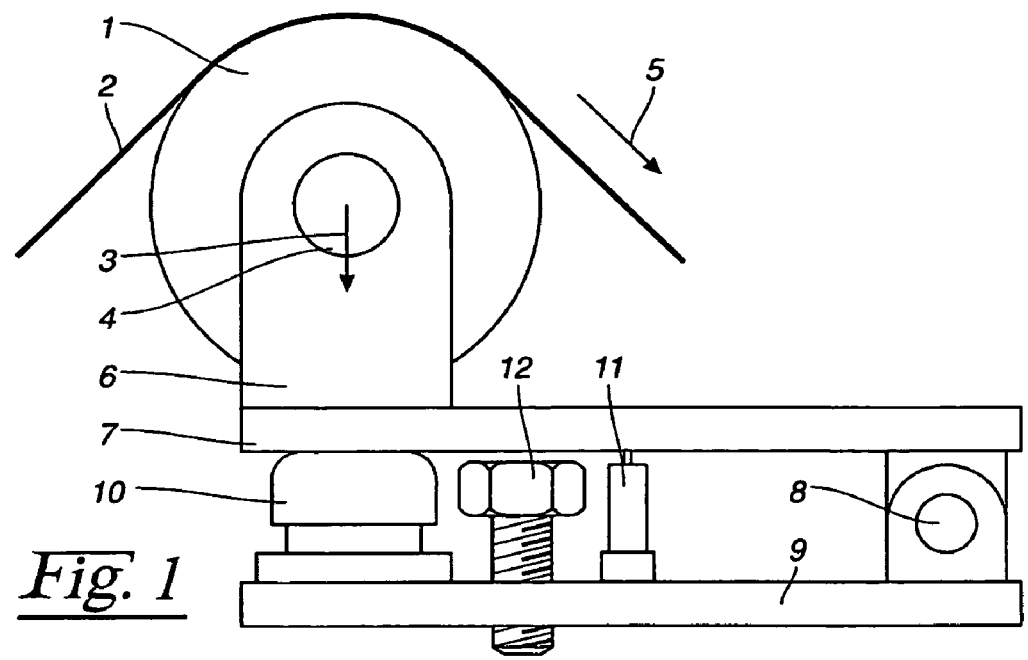
FIG. 1 shows an illustration of a roller having a force sensor.

FIG. 1 shows a roller 1 on which a running web 2 of material is deflected. The tensile stress 5 in the web 2 of material and the angle through which it loops around the roller 1 result in a bearing force 3 which acts on a bearing 4 of the roller 1. If the weight of the roller 1 is known and the angle through which it loops around the roller 1 is known, it is sufficient to measure the bearing force 3 in order to determine the tensile stress 5 in the web 2 of material.

In order to detect the bearing force 3, the bearing 4 of the roller 1 is supported via brackets 6 on a plate 7 which can pivot. The plate 7 is held such that it can pivot about a pivoting bearing 8 which is supported on a stationary plate 9. The roller 1 can therefore be pivoted freely about the pivoting bearing 8 as a rotation shaft. A force sensor 10 is provided under the roller 1, detects the bearing force 3, and converts it to an electrical signal.

A limit switch 11 is provided between the plates 7, 9 and is operatively connected to a drive, which is not illustrated, for the web 2 of material. When this limit switch 11 is operated, the drive for the web 2 of material is then interrupted, in order to react to a fault situation. In contrast to the illustration shown in FIG. 1, the limit switch 11 can also be integrated within the force sensor 10.

In addition, a thrust screw 12 is provided between the plates 7, 9, with the aid of which the two plates 7, 9 can be forced apart from one another. The load on the force sensor 10 can be removed completely with the aid of this thrust screw 12 in order to allow it to be installed and removed easily. The simplifies servicing tasks on the force sensor 10. Furthermore, the thrust screw 12 is used as a transport security device and for protection of the force sensor 10 while the roller 1 is being inserted into an installation.

Figure 2:
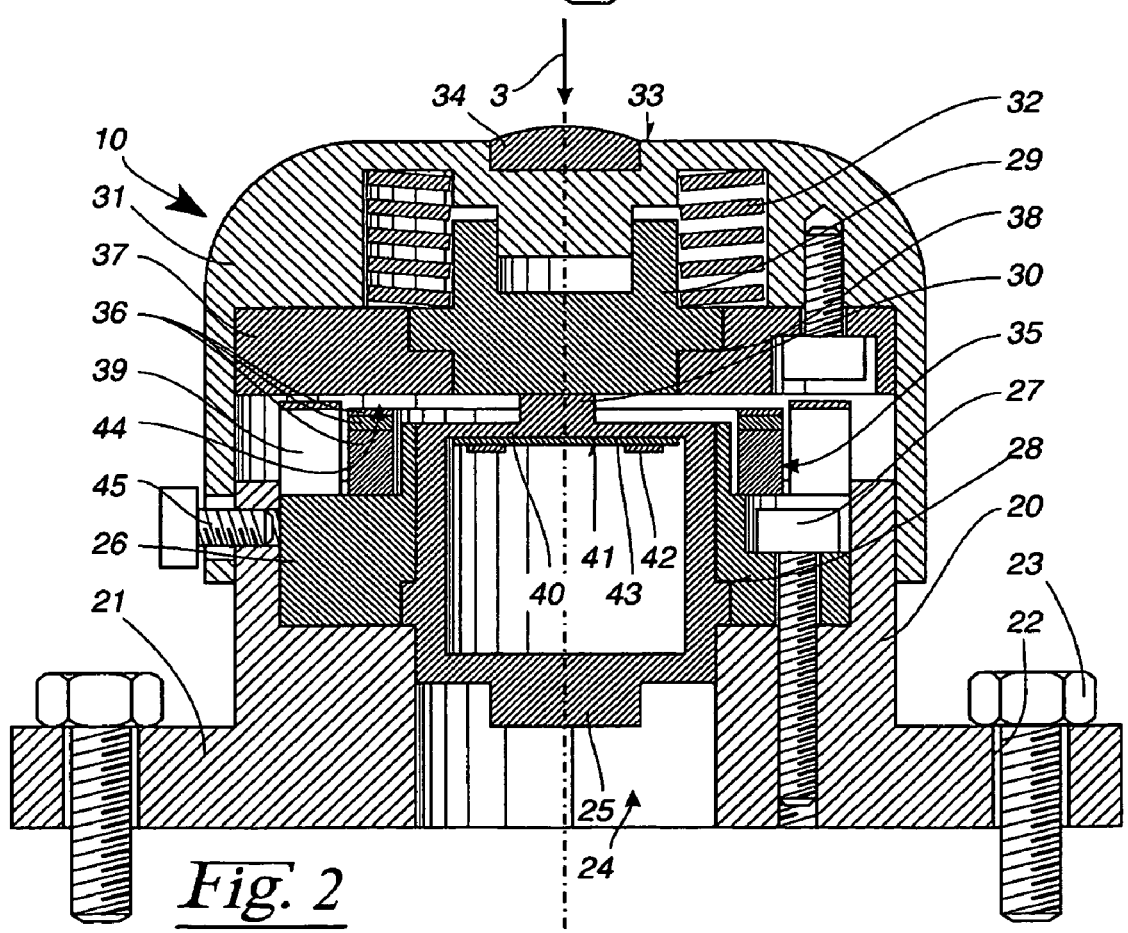
FIG. 2 shows an enlarged section illustration of the force sensor as shown in FIG. 1.

The design of the force sensor 10 will be explained in more detail with reference to the section illustration shown in FIG. 2. The force sensor 10 has a base element 20 on the lower face of which a flange 21 is integrally formed. This flange 21 is provided with holes 22 through which screws 23 are passed. These screws 23 are used to fix the force sensor 10 on the stationary plate 9.

The base element 20 has an essentially cylindrical central cavity 24 which widens like a step upward. A sensor element 25 is supported in this central cavity 24. A ring 26 is provided in order to fix the sensor element 25 in the base element 20 and surrounds a step-like narrowed area 28 of the sensor element 25 on the top. This ring 26 is fixed in the base element 20 by means of screws 27 such that the sensor element 25 is firmly connected to the base element 20.

A pressure piece 29 is provided in order to introduce the bearing force 3 into the sensor element 25, and presses from above against a stud 30 on the sensor element 25. This pressure piece 29 is supported in a bell 31, which protects the sensor element 25, and is prestressed by means of a spring 32 against the sensor element 25. In this case, the bell 31 is held such that it can move relative to the base element 20. At the upper end 33, the bell 31 has a hardened stud 34 which presses against the plate 7, which can pivot. The bearing force 3 is introduced into the sensor element 25 in this way via the bell 31, the spring 32 and the pressure piece 29.

In order to protect the sensor element 25 against overloading, the pressure piece 29 interacts with a stop 35 which is formed by a number of rings 36. The rings 36 have different thicknesses, in order in this way to provide the required stop height. The stop 36 acts against a ring 37 on the bell 31, which is designed to be wider at the top like a step. This step-like widened area 38 forms a further stop for the pressure piece 29, which further stop keeps any excessive force peak away from the sensor element 25. An additional corrugated spring 39 is provided around the stop 35 and is essentially intended to damp hard impacts against the stop 35. In this case, the corrugated spring 39 is designed to be considerably weaker than the spring 32.

An elastically deformable plate 40 is provided in the sensor element 25 and is subject to elastic bending deformation by the influence of the pressure piece 29. The bearing force 3 is therefore converted to deformation of the plate 40. Force pickups 42 in the form of strain gauges are fitted on the lower face 41 of the plate 40 and convert the elastic deformation of the plate 40 to an electrical signal, in particular a resistance change. In this case, four force pickups 42 are provided, and are connected to form a Wheatstone bridge. The force pickups 42 are connected over an area to the plate 40 via an elastomeric membrane 43, in order to prevent the force pickup 42 from being destroyed if the plate 40 bends excessively. Alternatively, the force pickups 42 could also be fitted directly on the elastically deformable plate 40.

During normal operation, the plate 7 which can pivot rests on the bell 31. The bearing force 3 that acts is transmitted from the spring 32 to the pressure piece 29 which presses exclusively against the sensor element 25. In this case, the spring 32 presses the pressure piece 29 against the ring 37 such that the pressure piece 29 together with the bell 31 forms a fixed unit. In this case, a gap 44 is formed between the ring 37 and the stop 35. In this operating mode, the bearing force 3 is detected by the sensor element 25 exactly and without corruption.

If high load peaks of the bearing force 3 occur, for example as a result of impacts, then the spring 32 is compressed such that the bell 31 is moved downward together with the ring 37, without the pressure piece 29 also carrying out this movement. In the process, a gap is formed between the pressure piece 29 and the ring 37, in the area of the step-like widened area 38. As a result of this, the pressure piece 29 passes on the force peak to the sensor element 25 with a delay, in a similar manner to the effect of a shock absorber. In consequence, the magnitude of the force peak is reduced, with the time for which the impact is applied correspondingly increasing because of the storage effect of the spring 32. The mean value of the measured bearing force accordingly remains the same, but the damaging effect of the impacts is correspondingly reduced.

In the event of very high-energy impacts on the bell 31, the ring 37 strikes the stop 35, as a result of which the gap 44 there disappears. A portion of the bearing force 3 is thus introduced into the base element 20 via the ring 37 and the stop 35, bypassing the sensor element 25. The sensor element 25 is protected against severe overloads in this way.

In addition, a securing element 45 in the form of a screw is provided between the bell 21 and the base element 11. This securing element 45 passes through the bell 21, without actually having to touch it. The securing element 45 in this way prevents the bell 21 from being lost if, for example, the force sensor 10 is aligned upside-down, that is to say with the bell 21 at the bottom. In addition, the securing element 45 makes it easier to assemble the force sensor 10.

LIST OF REFERENCE SYMBOLS

1 Roller
2 Web of material
3 Bearing force
4 Bearing plate
5 Tensile stress
6 Bracket
7 Plate which can pivot
8 Pivoting bearing
9 Stationary plate
10 Force sensor
11 Limit switch
12 Thrust screw
20 Base element
21 Flange
22 Hole
23 Screw
24 Cavity
25 Sensor element
26 Ring
27 Screw
28 Narrowed area
29 Pressure piece
30 Stud
31 Bell
32 Spring
33 Upper end
34 Stud
35 Stop
36 Ring
37 Ring
38 Step-like widened area
39 Corrugated spring
40 Elastically deformable plate
41 Lower face
42 Force pickup
43 Membrane
44 Gap
45 Securing element

The invention claimed is:

1. A roller for deflection of a web of material (2), with the roller (1) being supported on a plate (7) which is operatively connected to a force sensor (10) for measurement of a bearing force (3) of the roller (1), which force sensor (10) has a base element (20) on which at least one sensor element (25) is provided which has at least one plate (40) which can be deformed elastically by the bearing force (3), and characterized in that the plate (7) which supports the roller (1) is held such that it can pivot about a pivoting bearing (8) which is supported on a stationary plate (9), with the force sensor (10) being provided between the plate (7) which can pivot and the stationary plate (8), and with the elastically deformable plate (40) being fitted with at least one force pickup (42), and with the sensor element (25) being loaded by a pressure piece (29), with the bearing force (3) being introduced into the pressure piece (29) via at least one spring (32) which—seen in the force direction—has a greater spring movement for the same load than the elastically deformable plate (40), and with the pressure piece (29) being able to be pressed flat against an annular stop (35) in order to limit the force acting on the sensor element (25), which annular stop (35) is provided around the sensor element (25, wherein the bearing force (3) is introduced into the pressure piece (29) via at least one spring (32) which—seen in the force direction—has a greater spring movement for the same load than the elastically deformable plate (40), and at least one spring element (43) is provided between the force pickup (42) and the elastically deformable plate (40) in order to limit the force acting on the force pickup (42).

2. The roller as claimed in claim 1, characterized in that the stop (35) rests loosely on the base element (20).

3. The roller as claimed in claim 1, characterized in that the stop (35) comprises a plurality of parts (36) which can be stacked one on top of the other, for height matching.

4. The roller as claimed in claim 1, characterized in that the stop (35) is composed of hardened steel.

5. The roller as claimed in claim 1, characterized in that at least one further spring (39) is connected in parallel with the stop (35).

6. The roller as claimed in claim 1, characterized in that the spring element (43) is formed from a rubber-like component.

7. The roller as claimed in claim 1, characterized in that the spring element (43) is formed by a membrane (43) which is connected over an area to the elastically deformable plate (40) and to the force pickup (42).

8. The roller as claimed in claim 1, characterized in that the force pickup (42) is formed by at least one strain gauge.

9. A roller for deflection of a web of material (2), with the roller (1) being supported on a plate (7) which is operatively connected to a force sensor (10) for measurement of a bearing force (3) of the roller (1), which for sensor (10) has a base element (20) on which at least one sensor element (25) is provided which has at least one plate (40) which can be deformed elastically by the bearing force (3), and characterized in that the plate (7) which supports the roller (1) is held such that it can pivot about a pivoting bearing (8) which is supported on a stationary plate (9), with the force sensor (10) being provided between the plate (7) which can pivot and the stationary plate (8), and with the elastically deformable plate (40) being fitted with at least one force pickup (42), and with the sensor element (25) being loaded by a pressure piece (29), with the bearing force (3) being introduced into the pressure piece (29) via at least one spring (32) which—seen in the force direction—has a greater spring movement for the same load than the elastically deformable plate (40), and with the pressure piece (29) being able to be pressed flat against an annular stop (35) in order to limit the force acting on the sensor element (25), which annular stop (35) is provided around the sensor element (25), wherein the force sensor (10) has at least one associated limit switch (11) which stops the movement of the web of material on operation.

10. The roller as claimed in claim 9, characterized in that the limit switch (11) is provided in the area of the stop (35).

11. The roller as claimed claim 9, characterized in that the force sensor (10) has at least one associated thrust screw (12) which can reduce the load on the force sensor (10).

12. The roller as claimed in claim 9, characterized in that the spring (32) is supported on a bell (31), with at least one securing element (45) being provided between the bell (31) and the base element (20).

13. A device for deflection of a web of material comprising a roller, a pivoting plate, a stationary plate, a pivoting bearing and a force sensor, said roller comprising a bearing and the web having a tension which applies a bearing force on said bearing, said bearing force having a radially orientated force direction, said roller being supported on said pivoting plate and being operatively connected to said force sensor for measurement of said bearing force of said roller, said force sensor comprising at least one force pickup, a pressure piece, at least one spring, an annular stop, a base element and at least one sensor element, said at least one sensor element being provided on said base element, said sensor element comprising at least one elastically deformable plate, said at least one elastically deformable plate having an elastic radial deformation when said bearing force is applied, and said pivoting plate is held such that it can pivot about said pivoting bearing while said pivoting bearing is supported on said stationary plate, said force sensor being situated between said pivoting plate and said stationary plate, and said elastically deformable plate being fitted with said at least one force pickup, and said sensor element being loaded by said pressure piece, with said bearing force being introduced into said pressure piece via said at least one spring, said at least one spring having a radially orientated spring movement which, in said radially orientated force direction, being greater for the same load than said elastic radial deformation of said elastically deformable plate, and with said pressure piece being able to be pressed flat against said annular stop in order to limit the force acting on said sensor element, said annular stop being situated around said sensor element.

14. The device as claimed in claim 13, wherein said annular stop rests loosely on said base element.

15. The device as claimed in claim 13, wherein said annular stop comprises a plurality of parts which can be stacked one on top of the other, for height matching.

16. The device as claimed in claim 13, wherein said annular stop is composed of hardened steel.

17. The roller as claimed in claim 13, wherein said force sensor further comprising at least one additional spring connected in parallel with said annular stop.

18. The device as claimed in claim 13, wherein said device further comprises at least one spring element provided between said force pickup and said elastically deformable plate in order to limit the force acting on said force pickup.

19. The device as claimed in claim 18, wherein said spring element is formed from a rubber-like component.

20. The device as claimed in claim 19, wherein said elastically deformable plate has an area and said spring element is formed by a membrane which is connected over said area to said elastically deformable plate and to said force pickup.

21. The device as claimed in claim 13, wherein said force pickup is formed by at least one strain gauge.

22. The device as claimed in claim 13, wherein said force sensor has at least one associated limit switch which stops movement of the web of material when actuated.

23. The device as claimed in claim 22, wherein said limit switch is provided in the area of said stop.

24. The device as claimed in claim 13, wherein said force sensor has at least one associated thrust screw adapted to reduce the load on the force sensor.

25. The device as claimed in claim 13, wherein said force sensor further comprises a bell, said spring is supported on said bell, with at least one securing element being situated between said bell and said base element.

* * * * *